(12) United States Patent
Tabata et al.

(10) Patent No.: US 8,004,256 B2
(45) Date of Patent: Aug. 23, 2011

(54) CURRENT LIMITING CIRCUIT

(75) Inventors: Katsuyuki Tabata, Kyoto (JP); Mikio Motomori, Osaka (JP)

(73) Assignee: Panasonic Corporation, Osaka (JP)

( * ) Notice: Subject to any disclaimer, the term of this patent is extended or adjusted under 35 U.S.C. 154(b) by 9 days.

(21) Appl. No.: 12/726,791

(22) Filed: Mar. 18, 2010

(65) Prior Publication Data

US 2010/0244797 A1 Sep. 30, 2010

(30) Foreign Application Priority Data

Mar. 31, 2009 (JP) ................. 2009-087366

(51) Int. Cl.
*G05F 1/00* (2006.01)

(52) U.S. Cl. ........ 323/271; 323/222; 323/282; 323/284; 323/285

(58) Field of Classification Search .......... 323/222, 323/223, 224, 238, 271, 272, 282, 284, 285
See application file for complete search history.

(56) References Cited

U.S. PATENT DOCUMENTS

| | | |
|---|---|---|
| 5,159,516 A | 10/1992 | Fujihira |
| 5,282,107 A | 1/1994 | Balakrishnan |
| 7,245,116 B2 | 7/2007 | Tateno et al. |
| 7,391,199 B2 * | 6/2008 | Akashi et al. ............. 323/285 |
| 7,893,677 B2 * | 2/2011 | Nguyen .................. 323/284 |
| 2008/0129257 A1 * | 6/2008 | Lee ..................... 323/271 |
| 2009/0079405 A1 * | 3/2009 | Brokaw et al. ............ 323/271 |

FOREIGN PATENT DOCUMENTS

| | | |
|---|---|---|
| JP | 03-143221 A | 6/1991 |
| JP | 05-026912 | 2/1993 |
| JP | 06-169567 A | 6/1994 |
| JP | 11-252909 | 9/1999 |
| JP | 2004-289891 | 10/2004 |
| JP | 2005-304210 | 10/2005 |
| JP | 2008-131764 | 6/2008 |

* cited by examiner

*Primary Examiner* — Adolf Berhane
*Assistant Examiner* — Nguyen Tran
(74) *Attorney, Agent, or Firm* — McDermott Will & Emery LLP

(57) ABSTRACT

A current limiting circuit for a boost converter includes a voltage divider circuit between a main switch which flows a current to an inductor and a comparator included in a current detecting circuit. The voltage divider circuit includes two transistors of the same type as that of the main switch, which are connected in series. One of the two transistors is a sub-switch which is connected between a voltage division point and a drain terminal of the main switch, and is turned on/off in synchronization with the main switch in accordance with an output signal of a control circuit. The other transistor is a detection resistance transistor which is connected between the voltage division point and a source terminal of the main switch, and whose gate terminal is connected to a bias voltage so that the detection resistance transistor is always on.

5 Claims, 4 Drawing Sheets

CURRENT LIMITING CIRCUIT

CROSS-REFERENCE TO RELATED APPLICATION

This application claims priority to Japanese Patent Application No. 2009-087366 filed on Mar. 31, 2009, the disclosure of which including the specification, the drawings, and the claims is hereby incorporated by reference in its entirety.

BACKGROUND

The present disclosure relates to current limiting circuits for boost converters which supply an output voltage higher than an input direct-current voltage.

The boost converter is a switching-mode power supply circuit which supplies an output voltage higher than an input voltage from an input power supply, such as a battery or the like. The boost converter includes an inductor one end of which is connected to the input power supply, a main switch which is connected to the other end of the inductor and applies an input voltage to the inductor during the on-state, a rectifier which is also connected to the other end of the inductor and flows a current to the output when the main switch is off, a smoothing capacitor which smoothes power obtained via the rectifier to supply an output direct-current voltage, and a control circuit which performs switching control to stabilize the output voltage while adjusting an on-time and an off-time of the main switch.

In the boost converter, when the load rapidly increases or when switching is performed so that the target output voltage is increased, the on-time of the main switch is increased so that the output voltage is controlled, and therefore, a current flowing through the inductor (hereinafter referred to as an inductor current) rapidly increases. In order to protect components, such as the main switch, the inductor and the like, from such an increase in the inductor current, a current limiting circuit is used to detect the inductor current and block the output so that the inductor current does not exceed a predetermined limit current value.

When there is a sufficient margin between the inductor current within the normal operating range and the limit current value, the current limiting circuit can be designed so that it does not have to have very high current detection accuracy, but its components need to have excessive performance for resistance to current. In order to reduce the margin between the inductor current and the limit current value to avoid this, it is necessary to detect the inductor current with high accuracy.

Japanese Patent Laid-Open Publication No. 2008-131764 describes a current limiting circuit which flows a constant current to a reference transistor of the same type as that of the main switch of the boost converter, and uses a comparator to compare a voltage between both ends of the reference transistor (a reference input to the comparator) with the drain voltage of the main switch (a comparative input to the comparator), thereby canceling initial variations in the voltage between the reference input and the comparative input of the comparator, and temperature fluctuations to increase the current detection accuracy.

FIG. 4 is a diagram showing a circuit configuration of a boost converter having a conventional current limiting circuit (see Japanese Patent Laid-Open Publication No. 2008-131764). In the boost converter of FIG. 4, the reference character 1 indicates an input direct-current power supply which outputs an input direct-current voltage Vin. The reference character 2 indicates a boost circuit which is a boost DC-DC converter which includes an inductor 21, a main switch 22, a rectifying diode 23, and a smoothing capacitor 24, and generates an output voltage Vo from the input direct-current voltage Vin. The reference character 10 indicates a control circuit which detects the output voltage Vo and outputs a signal which is used to switch the main switch 22 so that the output voltage Vo becomes a target value. When the main switch 22 is turned on by the switch signal, the input direct-current voltage Vin is applied to the inductor 21, and therefore, the inductor current increases while energy is accumulated in the inductor 21. When the main switch 22 is turned off, the inductor current flows via the rectifying diode 23 to the smoothing capacitor 24 to charge the smoothing capacitor 24 while decreasing. In this case, the energy of the inductor 21 is discharged. This switching operation is repeatedly performed in predetermined switching cycles so that the output voltage Vo is output from the smoothing capacitor 24. The output voltage Vo increases with an increase in the proportion of the on-time with respect to the switching cycle (the proportion is referred to hereinafter as a duty ratio $\delta$). The output voltage Vo is represented by Vo=Vin/(1−$\delta$). The control circuit 10 controls the main switch 22 using the switch signal whose duty ratio $\delta$ has been adjusted, to stabilize the output voltage Vo against fluctuations of input/output conditions.

In FIG. 4, the reference character 4 indicates a current detecting circuit including a reference transistor 41 of the same type as that of the main switch 22, a constant current source 42, and a comparator 40. The comparator 40 compares a reference voltage which is generated by the reference transistor 41 and the constant current source 42, with a connection point voltage between the main switch 22 and the inductor 21, and outputs the result as a current limit signal to the control circuit 10. Here, the reference transistor 41 is a transistor whose gate terminal is connected to a bias voltage Vdd and is always on. The control circuit 10 forcedly turns off the main switch 22 when determining, based on the input current limit signal, that the inductor current is going to exceed the limit current value.

The comparative input voltage Vm and the reference input voltage Vc of the comparator 40 are represented by:

$$Vm = ILX \times RON1 \quad (1)$$

$$Vc = RON4 \times IR \quad (2)$$

where RON1 is the on-resistance value of the main switch 22, RON4 is the on-resistance of the reference transistor 41, IR is the current value of the constant current source 42, and ILX is the value of the inductor current.

The current detecting circuit 4 limits the current when Vm>Vc. Therefore, according to expressions (1) and (2), the limit current value ILM is represented by:

$$ILM = RON4/RON1 \times IR \quad (3)$$

When the main switch 22 is of the same type as that of the reference transistor 41, and the reference transistor 41 has an on-resistance value which is M times as great as that of the main switch 22, RON4/RON1=M, resulting in:

$$ILM = M \times IR \quad (4)$$

The on-resistance ratio M can be set with high accuracy, and in addition, initial variations, of the on-resistance of each of the main switch 22 and the reference transistor 41, power supply fluctuations, temperature shifts and the like can be canceled.

SUMMARY

In the boost converter of FIG. 4, when the main switch 22 is off, a voltage (Vo+VF) which is obtained by adding a forward voltage VF of the rectifying diode 23 to the output voltage Vo of the boost converter by the back electromotive force of the inductor 21, is applied to the drain terminal of the main switch 22. In addition, conventionally, the comparative input terminal of the comparator 40 is directly connected to the drain terminal of the main switch 22 in the current detecting circuit 4, and therefore, the breakdown voltage of the comparative input terminal of the comparator 40 needs to be set to be higher than the output voltage Vo which is boosted to be higher than the input direct-current voltage Vin. Therefore, the comparator 40 requires a semiconductor structure having a high breakdown voltage, disadvantageously leading to an increase in the circuit scale or the offset voltage.

The detailed description describes implementations of current limiting circuits which include a current detecting circuit without a semiconductor structure having a high breakdown voltage, can reduce or prevent an increase in the circuit scale or the offset voltage, can set an output voltage independently from the breakdown voltage of the current detecting circuit, and can detect a current with high accuracy.

A current limiting circuit according to an aspect of the present disclosure is provided in which an inductor current flowing to a main switch having a drain terminal whose breakdown voltage is higher than the output voltage of a boost converter, is detected and limited using a comparator which compares two input voltages, i.e., a reference input and a comparative input. The reference input is a voltage which is generated between both ends of a reference transistor which is of the same type as that of the main switch and has a greater on-resistance value, by flowing a constant current through the reference transistor. The comparative input is a voltage of a voltage division point of a voltage divider circuit including two transistors which are of the same type as that of the main switch and have a greater on-resistance, and are connected in series. The voltage divider circuit is connected between a source terminal and the drain terminal of the main switch, i.e., in parallel with the main switch. In addition, the transistor connected between the voltage division point of the voltage divider circuit and the drain terminal of the main switch is a sub-switch which is turned on/off in synchronization with the main switch. The transistor connected between the voltage division point of the voltage divider circuit and the source terminal of the main switch is a detection resistance transistor which is always on, and a voltage between both ends of the transistor is the comparative input of the comparator.

According to this current limiting circuit, the main switch of the boost converter and the sub-switch of the voltage divider circuit are synchronously turned on/off. Therefore, when the main switch is off, the connection between the drain terminal of the main switch and the comparative input terminal of the comparator in the current detecting circuit is opened. As a result, the increase in the voltage of the comparative input terminal of the comparator, which is the aforementioned problem, can be reduced or prevented, and therefore, the current detecting circuit can be formed without using a semiconductor structure having a high breakdown voltage. Moreover, the increase in the circuit scale and the offset voltage can be reduced or prevented, and the output voltage can be set irrespective of the breakdown voltage of the current detecting circuit.

Moreover, a transistor which is of the same type as that of the main switch and has a greater on-resistance value than that of the main switch is employed as the reference transistor which generates the reference input voltage of the comparator of the current detecting circuit and as the two transistors constituting the voltage divider circuit which generates the voltage of the comparative input terminal. As a result, initial variations in the on-resistance of each transistor, power supply fluctuations, and temperature fluctuations can be canceled, whereby the current detection accuracy can be improved.

DETAILED DESCRIPTION

A current limiting circuit for a boost converter according to an embodiment of the present disclosure will be described hereinafter with reference to the accompanying drawings.

Figure 1:
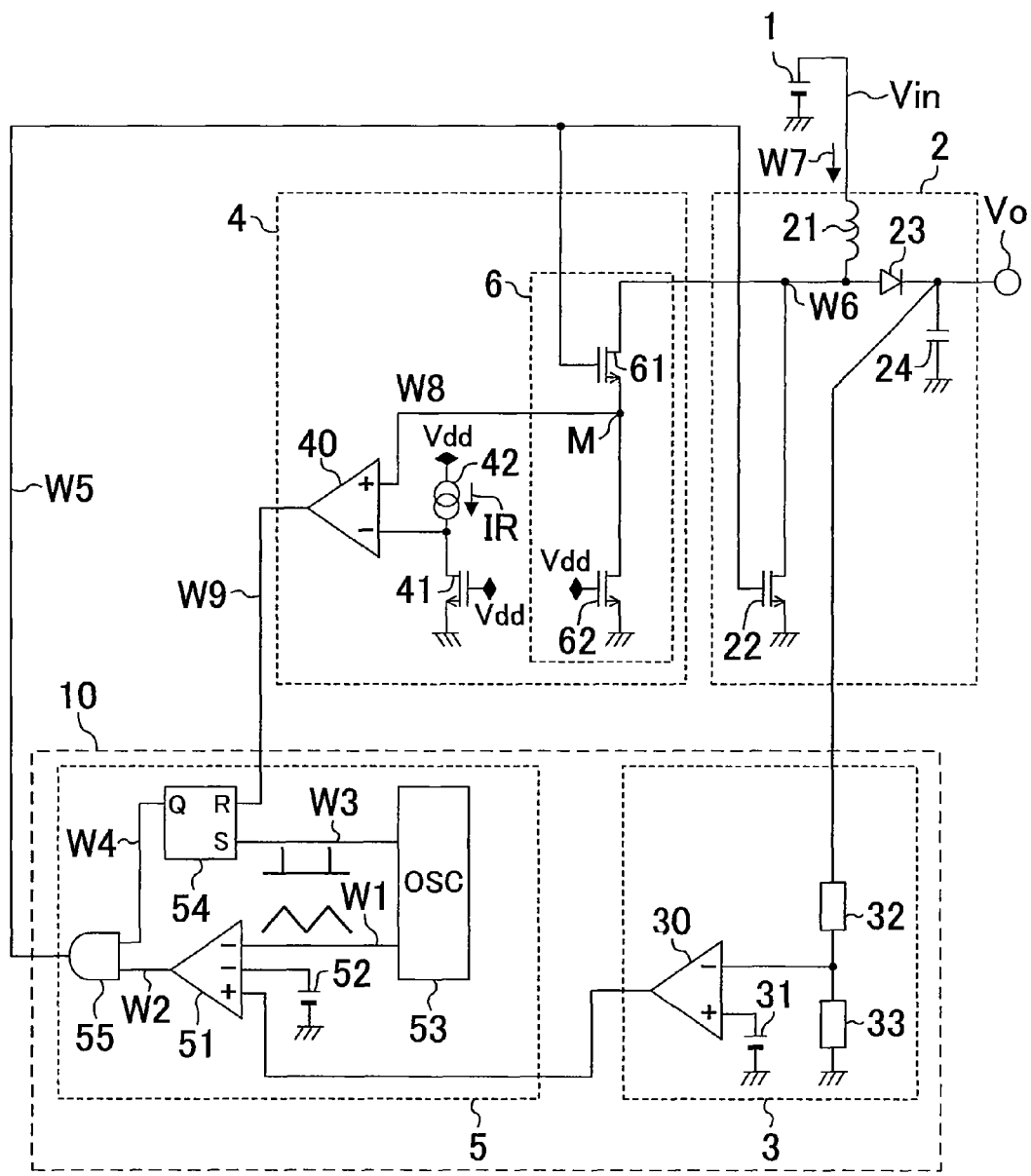
FIG. 1 is a diagram showing a circuit configuration of a boost converter having a current limiting circuit according to an embodiment of the present disclosure.

FIG. 1 is a diagram showing a circuit configuration of a boost converter having the current limiting circuit of the embodiment of the present disclosure. In FIG. 1, the reference character 1 indicates an input direct-current power supply which outputs an input direct-current voltage Vin. The reference character 2 indicates a boost circuit which is a boost DC-DC converter including an inductor 21, a main switch 22, a rectifying diode 23, and a smoothing capacitor 24, and generates an output voltage Vo from the input direct-current voltage Vin.

The reference character 3 indicates an output detecting circuit includes an error amplifier 30 which receives a voltage which is obtained by dividing the output voltage Vo using resistors 32 and 33, and a reference voltage Vr which is generated by a reference voltage source 31. The error amplifier 30 amplifies a differential voltage between the divided voltage and the reference voltage Vr, and outputs the differential voltage as an error signal.

The reference character 4 indicates a current detecting circuit which includes a voltage divider circuit 6 which generates a current detection voltage at a voltage division point M, a reference transistor 41 which is of the same type as that of the main switch 22 and has a greater on-resistance, a constant current source 42 which flows a constant current to the reference transistor 41, and a comparator 40 which compares a reference voltage between both ends of the reference transistor 41 with a voltage W8 at the voltage division point M of the voltage divider circuit 6, and outputs a current limit signal W9. Here, the reference transistor 41 has a gate terminal connected to a bias voltage Vdd so that the reference transistor 41 is always on. The voltage divider circuit 6 includes two transistors of the same type as that of the main switch 22 which are connected in series. One of the two transistors that is provided between the voltage division point M and a drain terminal of the main switch 22 is a sub-switch 61 which is turned on/off in synchronization with the main switch 22. The other transistor that is provided between the voltage division point M and a source terminal of the main switch 22 is a detection resistance transistor 62 having a gate terminal connected to the bias voltage Vdd so that the detection resistance transistor 62 is always on.

When the main switch 22 is on, the sub-switch 61 is also on, and the voltage W8 is output at the voltage division point M. The voltage W8 is generated by dividing a drain voltage W6 generated at the drain terminal of the main switch 22, where the drain voltage W6 is represented by the product of an inductor current W7 and the on-resistance of the main switch 22, using the on-resistances of the sub-switch 61 and the detection resistance transistor 62. When the main switch 22 is off, the sub-switch 61 is also off, and a ground voltage is output at the voltage division point M.

The reference character 5 indicates a modulation circuit which includes a comparator 51 which receives the error signal of the output detecting circuit 3, a maximum duty voltage generated by a voltage source 52, and a triangular wave W1 generated by an oscillator 53, an SR latch circuit 54 which is set by a set signal W3 which is a pulse signal which rises at vertices of the triangular waves W1 and is reset by the current limit signal W9, and an AND circuit 55 which receives a modulated signal W2 output from the comparator 51 and a latch signal W4 output from the SR latch circuit 54. The comparator 51 compares the lower one of the error signal of the output detecting circuit 3 and the maximum duty voltage with the triangular wave W1, and therefore, the output modulated signal W2 does not exceed a maximum duty ratio. A switch signal W5 output by the AND circuit 55 is used to control on/off of the main switch 22 and the sub-switch 61 to adjust the output voltage Vo.

Note that the output detecting circuit 3 and the modulation circuit 5 constitute a control circuit 10 which detects the output voltage Vo, and outputs the switch signal W5 which is used to control switching of the main switch 22 so that the output voltage Vo becomes a target value.

Figure 2:
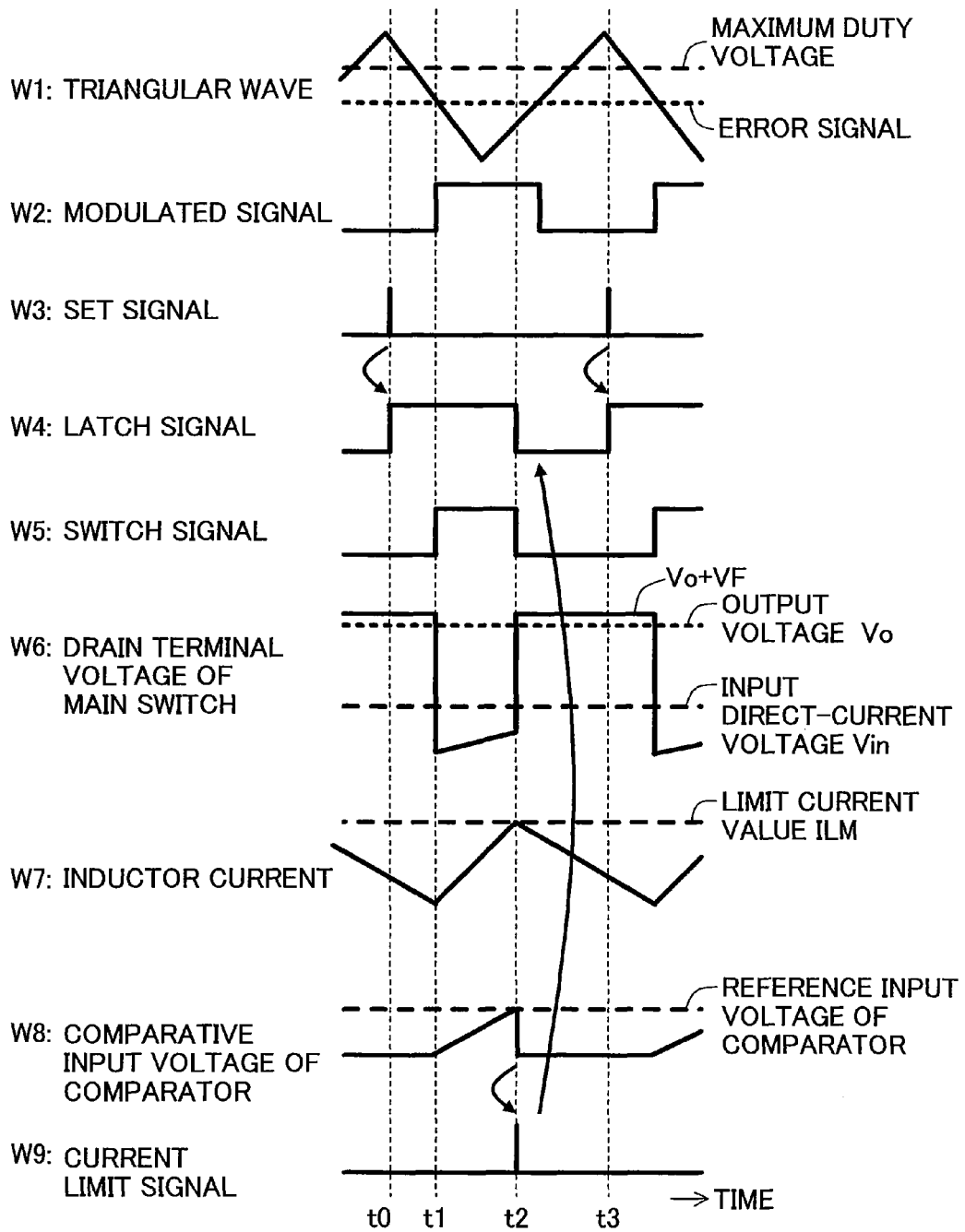
FIG. 2 is a diagram for describing operation of the current limiting circuit of the embodiment of the present disclosure.

FIG. 2 is an operation waveform diagram for describing operation of the current limiting circuit of the embodiment of the present disclosure. FIG. 2 shows waveforms of the triangular waves W1 of the oscillator 53, the modulated signal W2 of the comparator 51, the set signal W3 and the latch signal W4 of the SR latch circuit 54, the switch signal W5 of the AND circuit 55, the drain terminal voltage W6 of the main switch 22, the inductor current W7, the comparative input voltage W8 of the comparator 40, and the current limit signal W9 which is an output of the current detecting circuit 4.

The operation of the current limiting circuit of the embodiment of the present disclosure will be described hereinafter with reference to FIGS. 1 and 2.

Initially, at time t0, the set signal W3 is input to the SR latch circuit 54 of the modulation circuit 5. The SR latch circuit 54 is set by the set signal W3 which is a pulse signal which is output at timings of vertices of the triangular waves W1 which are generated by the oscillator 53 at switching cycles. The lower one of the voltage of the error signal of the output detecting circuit 3 and the maximum duty voltage of the voltage source 52 is compared and modulated with the triangular waves W1 of the oscillator 53 by the comparator 51. Therefore, at timings when the set signal W3 is input to the SR latch circuit 54, the modulated signal W2 is invariably low. The input set signal W3 causes the latch signal W4 of the SR latch circuit 54 to go high, and therefore, the AND circuit 55 passes the modulated signal W2 therethrough while keeping its value, i.e., the switch signal W5 is low, and the main switch 22 is therefore off.

Thereafter, at time t1, the voltage of the error signal of the output detecting circuit 3 becomes higher than the voltage of the triangular wave W1 of the oscillator 53, and therefore, the modulated signal W2 goes high. In this case, because the latch signal W4 continues to be high, the AND circuit 55 passes the modulated signal W2 therethrough while keeping its value, i.e., the switch signal W5 is high, and the main switch 22 is therefore turned on. In this case, energy is accumulated from the input direct-current voltage Vin into the inductor 21, resulting in an increase in the inductor current W7. In the current detecting circuit 4, the sub-switch 61 is turned on in synchronization with the turning on of the main switch 22, so that the voltage W8 which is obtained by dividing the drain terminal voltage W6 of the main switch 22 which is represented by the product of the on-resistance of the main switch 22 by the inductor current W7, appears at the voltage division point M. The divided voltage W8 is compared with a reference voltage which is generated between both ends of the reference transistor 41 when a constant current of the constant current source 42 is passed through the reference transistor 41, by the comparator 40 to monitor the inductor current W7.

If the output current of the boost converter is excessive, then when the modulated signal W2 is high and therefore the main switch 22 is on, the increased inductor current W7 reaches a limit current at time t2. The current detecting circuit 4 outputs the current limit signal W9 to reset the SR latch circuit 54, thereby causing the AND circuit 55 to block the modulated signal W2 from passing therethrough, so that the main switch 22 is forcedly turned off by the switch signal W5 to limit the inductor current W7. As a result, the voltage W6 of the drain terminal of the main switch 22 is increased, by the back electromotive force of the inductor 21, to a voltage (Vo+VF) which is obtained by adding the forward voltage VF of the rectifying diode 23 to the output voltage Vo of the boost converter. The limitation of the inductor current W7 is continued until time t3 that the set signal W3 of the next switching cycle is input to the SR latch circuit 54, so that the inductor current W7 continues to decrease.

Note that, during normal operation, the inductor current W7 does not reach the limit current when the modulated signal W2 of the comparator 51 is high and the main switch 22 is therefore on, so that the error signal of the output detecting circuit 3 becomes lower than the voltage of the triangular wave W1, and therefore, the modulated signal W2 of the comparator 51 becomes low and the main switch 22 is therefore turned off. The current detecting circuit 4 does not output the current limit signal W9, and a reset signal is not input to the SR latch circuit 54 and the set signal W3 continues to be input to the SR latch circuit 54 at switching cycles, and therefore, the AND circuit 55 passes the modulated signal W2 therethrough while keeping its value.

Figure 3:
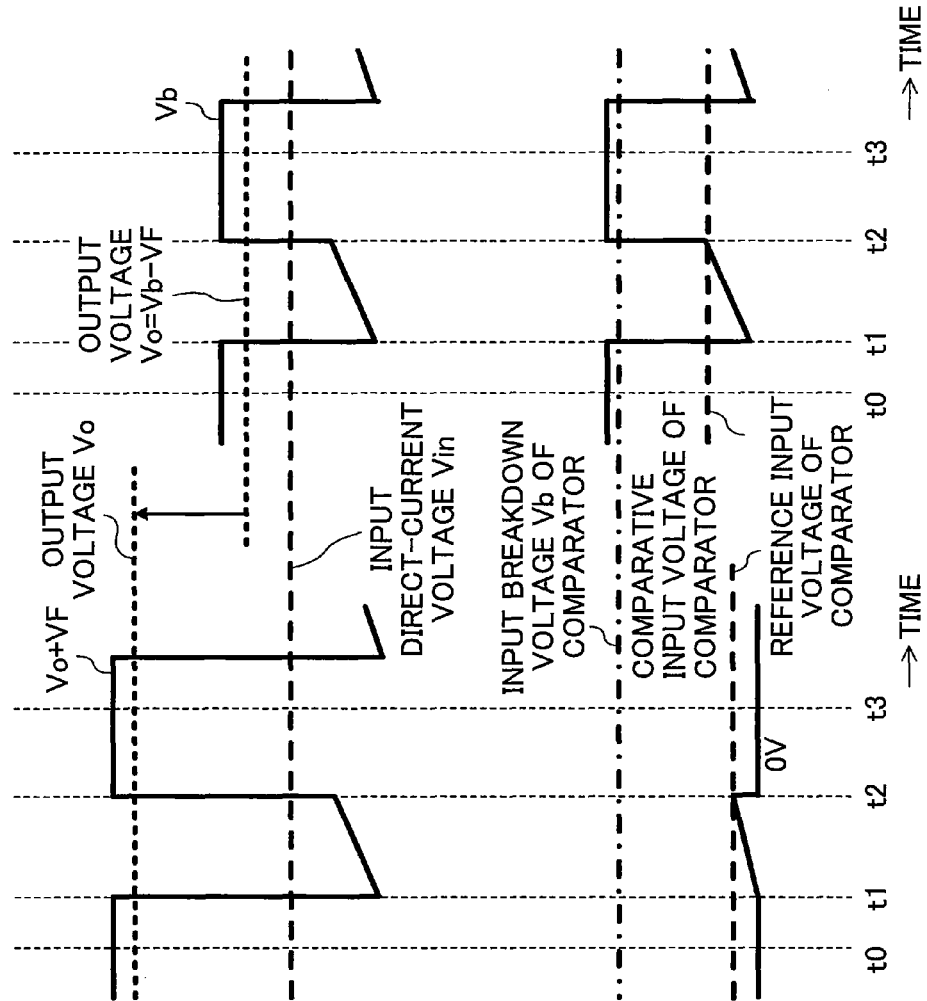
FIGS. 3A and 3B are diagrams for comparing operations of the current limiting circuit of the present disclosure with a conventional current limiting circuit.
Figure 4:
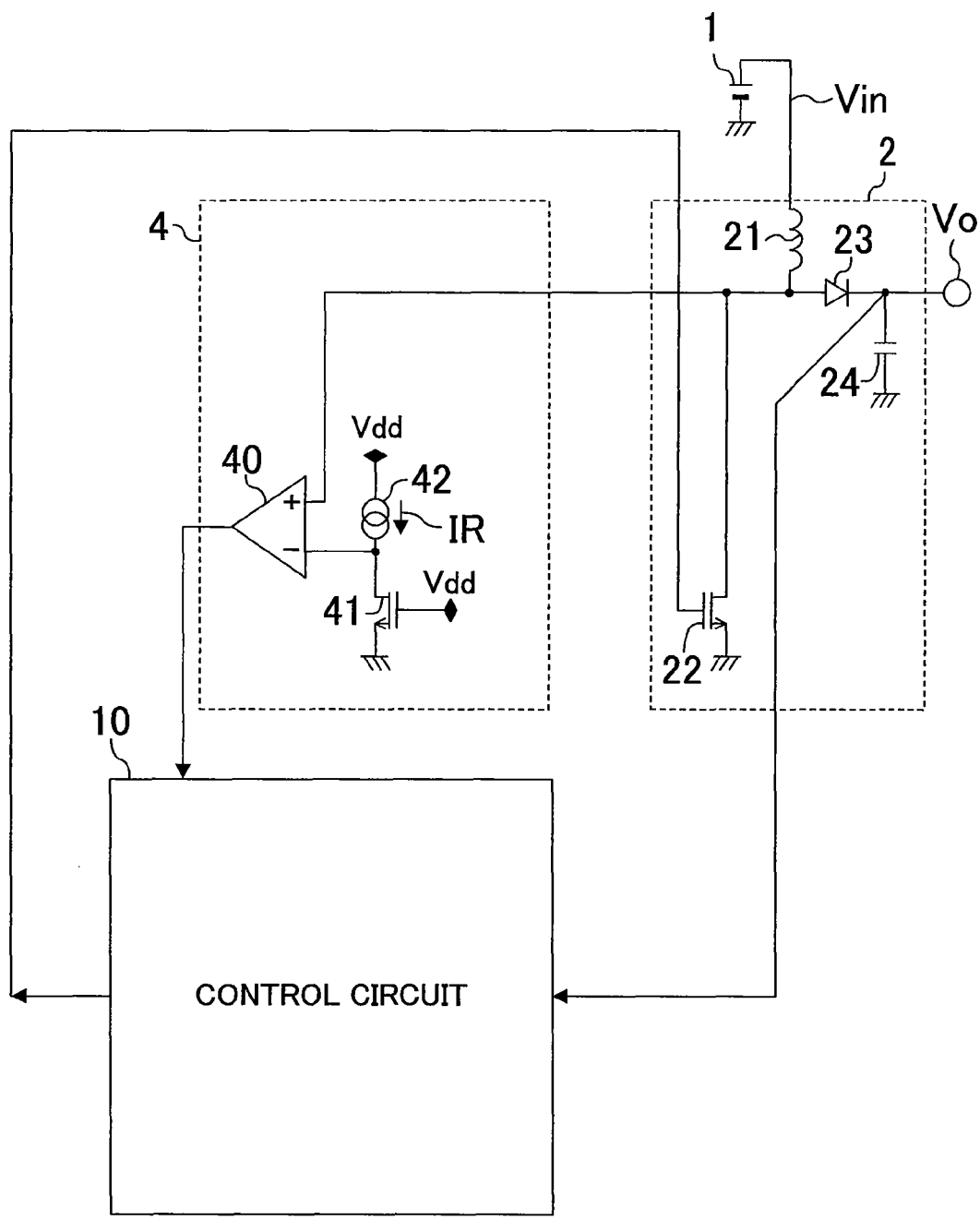
FIG. 4 is a diagram showing a circuit configuration of a boost converter having a conventional current limiting circuit.

FIGS. 3A and 3B show operation waveforms to compare the current limiting circuit of the present disclosure with a conventional current limiting circuit. When the main switch 22 is off, the voltage W6 of the drain terminal of the main switch 22 is increased, by the back electromotive force of the inductor 21, to a voltage (Vo+VF) which is obtained by adding the forward voltage VF of the rectifying diode 23 to the output voltage Vo of the boost converter.

In the conventional current limiting circuit, the comparative input terminal of the comparator 40 is invariably connected to the drain terminal of the main switch 22 in the current detecting circuit 4, and therefore, the comparative input voltage of the comparator 40 is increased to the same voltage as that of the drain terminal of the main switch 22 as shown in FIG. 3B. Therefore, the output voltage Vo cannot be set to be higher than a breakdown voltage Vb of the comparative input terminal of the comparator 40. Specifically, the boost converter can output no greater than Vb−VF as the output voltage Vo.

In contrast to this, in the current limiting circuit of the present disclosure, the sub-switch 61 is turned off, so that the connection between the drain terminal of the main switch 22 and the comparative input terminal of the comparator 40 is opened. As a result, as shown in FIG. 3A, the comparative input terminal of the comparator 40 has a ground terminal voltage 0 V, whereby an increase in the voltage of the comparative input terminal is reduced or prevented. The boost converter can output the output voltage Vo which is higher than the breakdown voltage Vb of the comparative input terminal of the comparator 40.

The comparative input voltage Vm and the reference input voltage Vc of the comparator 40 are represented by:

$$Vm=ILX \times RON1/(1+RON2/RON3) \qquad (5)$$

$$Vc=RON4 \times IR \qquad (6)$$

where RON1 is the on-resistance of the main switch 22, RON2 is the on-resistance of the sub-switch 61, RON3 is the on-resistance of the detection resistance transistor 62, RON4 is the on-resistance of the reference transistor 41, IR is the current value of the constant current source 42, and ILX is the value of the inductor current W7.

The current detecting circuit 4 limits the current when Vm>Vc. Therefore, according to expressions (5) and (6), the limit current value ILM is represented by:

$$ILM=RON4/RON1 \times (1+RON2/RON3) \times IR \qquad (7)$$

When the main switch 22, the sub-switch 61, the detection resistance transistor 62, and the reference transistor 41 are all of the same type, and the sub-switch 61, the detection resistance transistor 62, and the reference transistor 41 have an on-resistance L (L>1), K (K>1), and M (M>1) times as great as that of the main switch 22, respectively, RON4/RON1=M and RON2/RON3=L/K. In this case, therefore, the limit current value ILM is represented by:

$$ILM=M \times (1+L/K) \times IR \qquad (8)$$

The on-resistance ratios K, L and M can all be set with high accuracy. In addition, initial variations of the on-resistance of each of the main switch 22, the sub-switch 61, the detection resistance transistor 62, and the reference transistor 41, and power supply fluctuations, and temperature fluctuations can be canceled.

Note that, in the current limiting circuit of the present disclosure, the main switch 22, the sub-switch 61, the detection resistance transistor 62, and the reference transistor 41 are preferably formed on the same chip, and are preferably arranged adjacent to each other, whereby an increase in the chip temperature caused by heat generated by the main switch 22 is uniform in the transistors, and therefore, the temperature-induced shifts can be canceled.

Moreover, in the current limiting circuit of the present disclosure, the source terminals of the main switch 22, the detection resistance transistor 62, and the reference transistor 41 are preferably connected to the same ground terminal, whereby it is possible to cancel a shift of a voltage between the gate and source terminals of each transistor which is caused by the floating of the ground terminal which is generated by a large current flowing through the main switch 22.

Moreover, in the current limiting circuit of the present disclosure, the voltages of the gate terminals which turn on the main switch 22, the sub-switch 61, the detection resistance transistor 62, and the reference transistor 41, respectively, are preferably set to the same voltage level, whereby it is possible to cancel a shift of a voltage between the gate and source terminals of each transistor which is caused by fluctuations of the power supply voltage.

As described above, the present disclosure is useful for apparatuses which use boost converters which output a voltage higher than an input voltage.

What is claimed is:

1. A current limiting circuit for a boost converter comprising:
    a control circuit configured to detect an output voltage and switch a main switch including a transistor so that the output voltage becomes a target value;
    a voltage divider circuit including two transistors of the same type as that of the main switch, the two transistors being connected in series;
    a reference transistor of the same type as that of the main switch and having a gate terminal connected to a bias voltage;
    a constant current source connected to a drain terminal of the reference transistor and configured to flow a constant current; and
    a comparator configured to compare a voltage at a voltage division point of the voltage divider circuit with a product of an on-resistance of the reference transistor and the current of the constant current source,
wherein
    the voltage divider circuit includes
        a sub-switch connected between the voltage division point of the voltage divider circuit and the drain terminal of the main switch and configured to perform switching in synchronization with the main switch in accordance with an output signal of the control circuit, and
        a detection resistance transistor connected between the voltage division point of the voltage divider circuit and a source terminal of the main switch, and having a gate terminal connected to a bias voltage so that the detection resistance transistor is always on, and
    the comparator outputs a current limit signal to block output of the control circuit when a signal indicating a result of the comparison reaches a predetermined level.

2. The current limiting circuit of claim 1, wherein the reference transistor, the sub-switch, and the detection resistance transistor are each of the same type as that of the main switch, and each have an on-resistance value greater than that of the main switch.

3. The current limiting circuit of claim 1, wherein the main switch, the reference transistor, the sub-switch, and the detection resistance transistor are formed on the same chip, and are arranged adjacent to each other.

4. The current limiting circuit of claim 1, wherein the main switch, the reference transistor, and the detection resistance transistor each have a source terminal connected to the same ground terminal.

5. The current limiting circuit of claim 1, wherein the main switch, the reference transistor, the sub-switch, and the detection resistance transistor are turned on by the same gate terminal voltage level.

* * * * *